(12) United States Patent
Tuttle (10) Patent No.: US 7,944,356 B2
(45) Date of Patent: *May 17, 2011

(54) METHOD AND SYSTEM TO DETERMINE PHYSICAL PARAMETERS AS BETWEEN AN RFID TAG AND A READER

(75) Inventor: John R. Tuttle, Boulder, CO (US)

(73) Assignee: Round Rock Research, LLC, Mt. Kisco, NY (US)

( * ) Notice: Subject to any disclaimer, the term of this patent is extended or adjusted under 35 U.S.C. 154(b) by 313 days.

This patent is subject to a terminal disclaimer.

(21) Appl. No.: 12/044,741

(22) Filed: Mar. 7, 2008

(65) Prior Publication Data

US 2009/0091428 A1    Apr. 9, 2009

Related U.S. Application Data

(63) Continuation-in-part of application No. 11/867,273, filed on Oct. 4, 2007.

(51) Int. Cl.
  *G08B 13/14*   (2006.01)
(52) U.S. Cl. .................... 340/572.1; 340/10.1
(58) Field of Classification Search ........... 340/10.1, 340/10.3, 10.4, 568.1, 568.5, 568.6, 568.7, 340/568.8, 571, 572.1
See application file for complete search history.

(56) References Cited

U.S. PATENT DOCUMENTS

| | | | |
|---|---|---|---|
| 4,016,568 A | | 4/1977 | Makimoto et al. |
| 4,075,632 A | | 2/1978 | Baldwin et al. |
| 4,236,048 A | * | 11/1980 | Olney ............................ 379/391 |
| 5,744,760 A | * | 4/1998 | Kobayashi et al. ........ 178/19.02 |
| 5,900,834 A | | 5/1999 | Kubinec |
| 6,084,530 A | * | 7/2000 | Pidwerbetsky et al. ...... 340/10.1 |
| 6,600,418 B2 | | 7/2003 | Francis et al. |
| 6,674,403 B2 | | 1/2004 | Gray et al. |
| 6,717,516 B2 | | 4/2004 | Bridgelall |
| 6,920,330 B2 | | 7/2005 | Caronni et al. |
| 7,045,996 B2 | | 5/2006 | Lyon et al. |

(Continued)

FOREIGN PATENT DOCUMENTS

KR    20060112976    11/2006

(Continued)

OTHER PUBLICATIONS

Transaction History of related U.S. Appl. No. 11/692,538, filed Mar. 28, 2007, entitled "Method and System to Determining Physical Characteristics Associated With Objects Tagged with RFID Tags."

(Continued)

*Primary Examiner* — George A Bugg
*Assistant Examiner* — Kerri McNally
(74) *Attorney, Agent, or Firm* — Lerner, David, Littenberg, Krumholz & Mentlik, LLP (57) ABSTRACT

A method and system to determine physical parameters as between an RFID tag and a reader. At least some of the illustrative embodiments are methods comprising generating an antenna feed signal, and transmitting a first electromagnetic wave to a radio frequency device (by coupling the antenna feed signal to a reading antenna), receiving a backscattered electromagnetic wave from the radio frequency device to create a received signal, calculating a combined signal based on the antenna feed signal and received signal, and determining relative velocity between the radio frequency device and the reading antenna based on the combined signal.

17 Claims, 5 Drawing Sheets

U.S. PATENT DOCUMENTS

| | | | |
|---|---|---|---|
| 7,049,965 | B2 | 5/2006 | Kelliher |
| 7,091,863 | B2 | 8/2006 | Ravet |
| 7,119,687 | B2 | 10/2006 | Paulsen et al. |
| 7,119,736 | B2 * | 10/2006 | Heide et al. ............ 342/125 |
| 7,142,120 | B2 | 11/2006 | Charych et al. |
| 7,156,312 | B2 | 1/2007 | Becker et al. |
| 7,215,976 | B2 | 5/2007 | Brideglall |
| 7,310,045 | B2 | 12/2007 | Inui |
| 7,378,967 | B2 | 5/2008 | Sullivan et al. |
| 7,388,501 | B2 | 6/2008 | Tang et al. |
| 7,403,120 | B2 | 7/2008 | Duron et al. |
| 7,432,810 | B2 | 10/2008 | Menache et al. |
| 7,453,363 | B2 | 11/2008 | Reynolds |
| 2004/0217865 | A1 | 11/2004 | Turner |
| 2005/0040994 | A1 | 2/2005 | Mazoki et al. |
| 2005/0237953 | A1 | 10/2005 | Carrender |
| 2005/0258937 | A1 | 11/2005 | Neuwirth |
| 2005/0280539 | A1 | 12/2005 | Pettus |
| 2006/0043199 | A1 | 3/2006 | Baba et al. |
| 2006/0273905 | A1 | 12/2006 | Choi et al. |
| 2007/0037582 | A1 | 2/2007 | Mohi et al. |
| 2007/0149216 | A1 | 6/2007 | Misikangas |
| 2007/0152831 | A1 | 7/2007 | Eisele |
| 2007/0182578 | A1 | 8/2007 | Smith |
| 2007/0205896 | A1 | 9/2007 | Beber et al. |
| 2008/0238685 | A1 | 10/2008 | Tuttle |
| 2008/0238686 | A1 | 10/2008 | Tuttle |
| 2008/0280560 | A1 | 11/2008 | Tuttle |
| 2009/0091428 | A1 | 4/2009 | Tuttle |
| 2009/0091454 | A1 | 4/2009 | Tuttle |
| 2009/0303004 | A1 | 12/2009 | Tuttle |
| 2009/0303005 | A1 | 12/2009 | Tuttle |

FOREIGN PATENT DOCUMENTS

| | | |
|---|---|---|
| KR | 20070021913 | 2/2007 |
| WO | 2007047226 | 4/2007 |

OTHER PUBLICATIONS

Transaction History of related U.S. Appl. No. 11/692,577, filed Mar. 28, 2007, entitled "Method and System to Determining Physical Characteristics Associated With Objects Tagged with RFID Tags."

Transaction History of related U.S. Appl. No. 11/746,244, filed May 9, 2007, entitled "Method and System of Placing a RFID Tag in a Continuous Transmission Mode."

Transaction History of related U.S. Appl. No. 11/867,273, filed Oct. 4, 2007, entitled "Method and System to Determine Physical Parameters as Between a RFID Tag and a Reader."

Transaction History of related U.S. Appl. No. 12/134,103, filed Jun. 5, 2008, entitled "Systems and Methods to Determine Motion Parameters Using RFID Tags."

Transaction History of related U.S. Appl. No. 12/134,106, filed Jun. 5, 2008, entitled "Systems and Methods to Use Radar in RFID Systems."

Transaction History of related U.S. Appl. No. 12/134,107, filed Jun. 5, 2008, entitled "Systems and Methods to Determine Kinematical Parameters Using RFID Tags."

Georgia State University, "Police Radar," at http://hyperphysics.phy-astr.gsu.edu/hbase/sound/radar.html, Jul. 1, 2003.

International Application No. PCT/US08/54901, International Search Report, Jul. 28, 2008.

International Application No. PCT/US08/54901, Written Opinion, Jul. 28, 2008.

International Application No. PCT/US08/55537, International Search Report, Jul. 30, 2008.

International Application No. PCT/US08/55537, Written Opinion, Jul. 30, 2008.

International Application No. PCT/US08/56247, International Search Report, Aug. 14, 2008.

International Application No. PCT/US08/56247, Written Opinion, Aug. 14, 2008.

Page, Raymond, "A Low Power RFID Transponder," RF Design, pp. 31-32, 34, 36, Jul. 1993.

Trolley Scan (Pty) Ltd., RFID-radar Newsletters No. 1-No. 12, Oct. 2005-Jan. 2007.

USPTO Transaction History of U.S. Appl. No. 11/867,273, filed Oct. 4, 2007, entitled "Method and System to Determine Physical Parameters as Between a RFID Tag and a Reader."

USPTO Transaction History of U.S. Appl. No. 12/134,103, filed Jun. 5, 2008, entitled "Systems and Methods to Determine Motion Parameters Using RFID Tags."

USPTO Transaction History of U.S. Appl. No. 12/134,106, filed Jun. 5, 2008, entitled "Systems and Methods to Use Radar in RFID Systems."

USPTO Transaction History of U.S. Appl. No. 12/134,107, filed Jun. 5, 2008, entitled "Systems and Methods to Determine Kinematical Parameters Using RFID Tags."

* cited by examiner

METHOD AND SYSTEM TO DETERMINE PHYSICAL PARAMETERS AS BETWEEN AN RFID TAG AND A READER

CROSS-REFERENCE TO RELATED APPLICATIONS

The present application is a continuation-in-part application of U.S. patent application Ser. No. 11/867,273, filed Oct. 4, 2007.

BACKGROUND

1. Field

The various embodiments are directed to determining physical parameters (e.g., velocity and acceleration) as between objects tagged with radio frequency identification (RFID) tags and reader circuits.

2. Description of the Related Art

Radio frequency identification (RFID) tags are used in a variety of applications, such as tagging vehicles on toll roads, tagging shipping containers, quality control on assembly line conveyer belts, and monitoring tactical military equipment maneuvers. In many situations it would be valuable to know physical parameters of the RFID tags and/or the objects coupled to the tags.

BRIEF DESCRIPTION OF THE DRAWINGS

For a detailed description of various embodiments, reference will now be made to the accompanying drawings in which.

DETAILED DESCRIPTION

The various embodiments disclosed herein are discussed in the context of radio frequency identification (RFID) tags; however, the systems and methods discussed have application beyond RFID tags to other types of radio frequency technologies. The discussion of any embodiment in relation to RFID tags is meant only to be illustrative of that embodiment, and not intended to intimate that the scope of the disclosure, including the claims, is limited to that embodiment.

Figure 1:
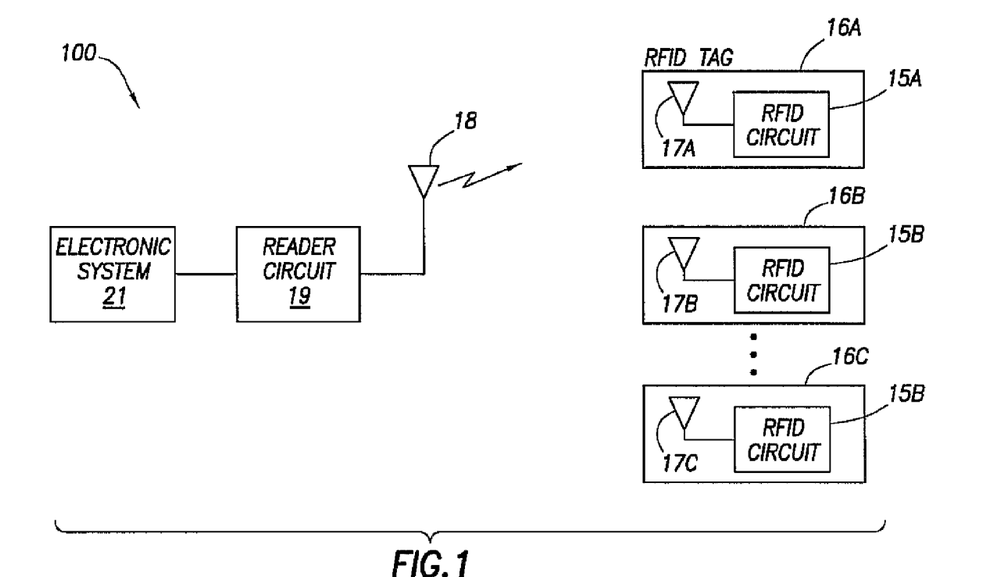
FIG. 1 shows a radio frequency identification (RFID) system in accordance with at least some embodiments.

FIG. 1 shows a system 100 in accordance with some embodiments. In particular, system 100 comprises an electronic system 21 (e.g., a computer system) coupled to a radio frequency identification (RFID) reader circuit 19. The reader circuit 19 may be equivalently referred to as an interrogator. By way of antenna 18, the reader circuit 19 communicates with one or more RFID tags 16A-16C proximate to the reader circuit (i.e., within communication range). In particular, the reader circuit 19 transmits an interrogating electromagnetic wave to communicate with one or more of the RFID tags 16A-16C.

Considering a single RFID tag 16A (but the description equally applicable to all the RFID tags 16), the communication sent by the reader circuit 19 is received by tag antenna 17A, and passed to the RFID circuit 15A. If the communication from the reader circuit triggers a response, the RFID circuit 15A sends to the reader circuit 19 the response (e.g., a tag identification value, or data held in the tag memory) using the tag antenna 17A. The reader circuit 19 passes data obtained from the various RFID tags 16 to the electronic system 21, which performs any suitable function. For example, the electronic system 21, based on the data received from the RFID tags 16, may allow access to a building or parking garage, note the entrance of an employee to a work location, direct a parcel identified by the RFID tag 16 down a particular conveyor system, or inventory products in a shopping cart for purposes of checkout and payment. In accordance with some embodiments, the reader circuit 19 and/or the electronic system 21 also determine physical parameters as between the RFID tag 16A using, at least in part, backscattered electromagnetic waves from the RFID tag 16A. Thus, the discussion turns to a description of backscattered electromagnetic waves produced by RFID tags.

There are several types of RFID tags operable in the illustrative system 100 that produce backscattered electromagnetic waves. For example, RFID tags may be semi-active tags, meaning each RFID tag comprises its own internal battery or other power source, but a semi-active tag remains dormant (i.e., powered-off or in a low power state) most of the time. When an antenna of a semi-active tag receives an interrogating electromagnetic wave, the power received is used to wake or activate the semi-active tag, and a response (if any) comprising an identification value is sent by modulating the backscattered electromagnetic wave from the tag antenna, with the semi-active tag using power for internal operations from its internal battery or power source. In particular, the reader circuit 19 and antenna 18 continue to transmit power after the RFID tag is awake. While the reader circuit 19 transmits, the tag antenna 17 of the RFID tag 16 is selectively tuned and de-tuned with respect to the carrier frequency. When tuned, significant incident power is absorbed by the tag antenna 17. When de-tuned, significant power is reflected or backscattered by the tag antenna 17 to the antenna 18 of the reader circuit 19.

A second type of RFID tag that produces backscattered electromagnetic waves is a passive tag, which, unlike semi-active RFID tags, has no internal battery or power source. The tag antenna 17 of the passive RFID tag receives an interrogating electromagnetic wave from the reader circuit, and the power extracted from the received interrogating electromagnetic wave is used to power the tag. Once powered or "awake," the passive RFID tag may accept a command, send a response comprising a data or identification value, or both; however, like the semi-active tag the passive tag sends the response in the form of a backscattered electromagnetic wave.

In accordance with at least some embodiments, the reader circuit 19 and/or the electronic system 21 determine physical parameters (e.g. velocity) between the RFID tag 16 and the reading antenna 18 using, at least in part, backscattered electromagnetic waves. The backscattered electromagnetic waves received at the reading antenna 18 from the tag antenna 17 can be used coherently in combination with the interrogating wave transmitted from the reading antenna 18 to the tag antenna 17. Thus, the discussion now turns to determining physical parameters in an RFID system using backscattered electromagnetic waves.

In accordance with the various embodiments, the electronic system 21 and/or the reader circuit 19 generates an antenna feed signal at a carrier frequency (e.g., using a local oscillator, or using a digital signal processor by way of a digital to analog converter). The term antenna feed signal is not limited to just high voltage/high current signal directly applied to an antenna, and also refers to the initial signal before voltage/current amplification. The antenna feed signal is applied to the reading antenna 18, which in turn transmits an electromagnetic wave to interrogate the RFID tag 16 (hence, an interrogating electromagnetic wave). The RFID tag 16 (i.e. semi-active tag or passive tag) responds with a backscattered electromagnetic wave, as discussed above. The reading antenna 18 converts incident backscattered electromagnetic wave into a received signal having frequency, phase and amplitude corresponding to the backscattered electromagnetic wave. The received signal is then passed to the reader circuit 19 and/or electronic system 21. The reader circuit 19 and/or electronic system 21 combine the antenna feed signal and received signal, and analyze the combined signal to determine the physical parameters.

Figure 2:
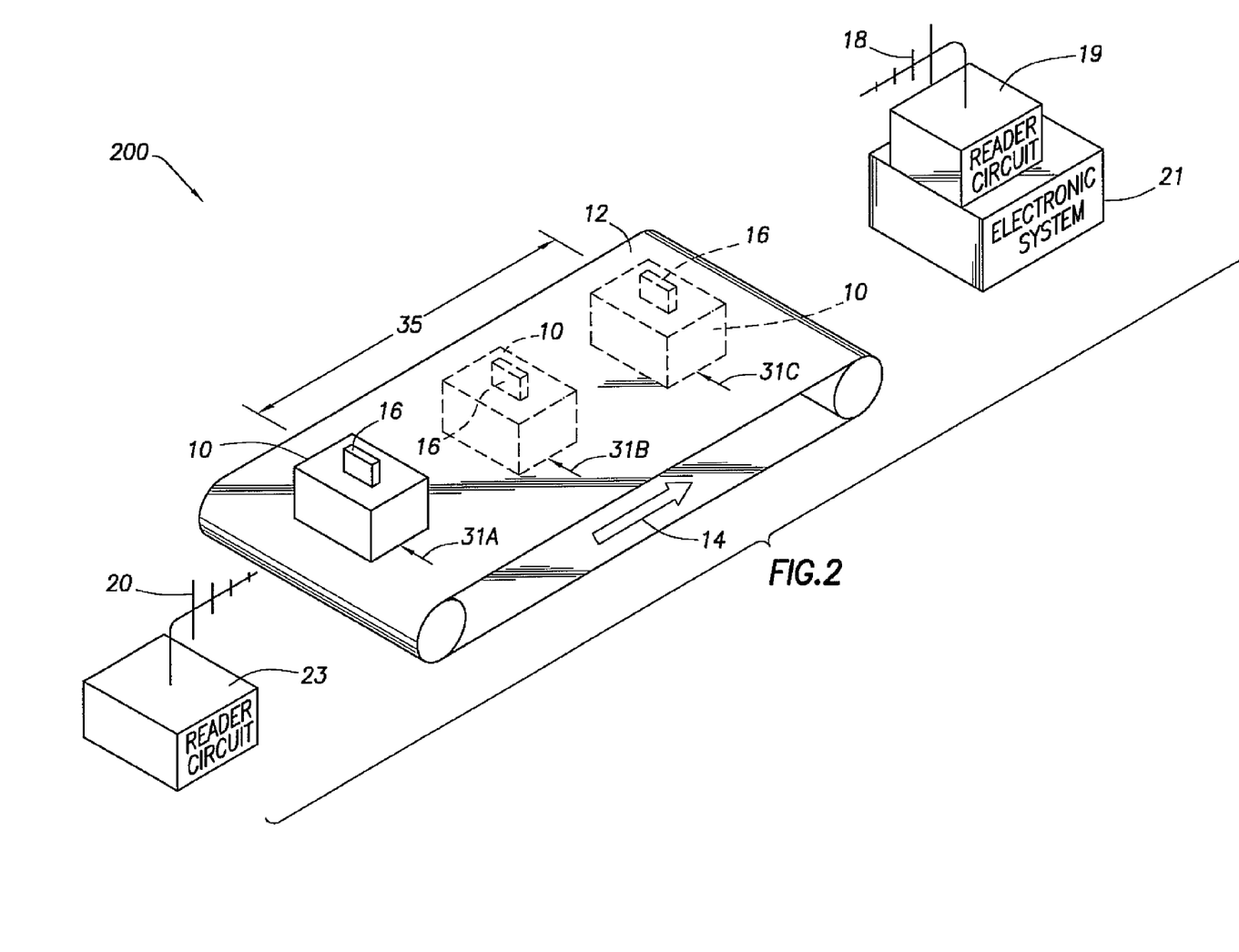
FIG. 2 shows a system in accordance with at least some embodiments.

FIG. 2 shows a system 200 in accordance with some embodiments. In particular, system 200 shows an object 10 on a conveyor system 12, with the object 10 selectively moving in the direction indicated by arrow 14. Conveyor system 12 is merely illustrative of any situation where an object 10 moves in two- or three-dimensional space. For example, the object 10 and conveyor system 12 are illustrative of wafer boats in semiconductor manufacturing production line, luggage in an automated luggage handling system, parcels in an automated sorting facility, or participants in a war game. The object 10 has an associated RFID tag 16, which as illustrated is visible from both sides of object 10. In system 200, the reading antenna 18 is shown as a Yagi-Uda antenna, but other antenna types (e.g., dipole, loop or patch antennas) may be equivalently used. FIG. 2 further shows three illustrative positions of the RFID tag 16 and/or object 10. In particular, FIG. 2 shows an initial location 31A, and two subsequent locations 31B and 31C. For reasons that will become apparent in reference to FIG. 3, the illustrative physical distance between the initial location 31A and location 31B is a quarter of the wavelength $\lambda$ of the interrogating electromagnetic wave, and the illustrative physical distance between the initial location 31A and location 31C (i.e., distance 35) is half of the wavelength $\lambda$ of the interrogating electromagnetic wave. Since the interrogating electromagnetic wave travels from the reading antenna 18 to the RFID tag 16 and then back to the reading antenna 18, the change in the distance the interrogating electromagnetic wave traveled is twice that the distance RFID tag 16 moved. Thus, for example, since the physical distance between the location 31A and location 31B is a quarter of the wavelength $\lambda$, the change in total wave path for interrogating the tag 16 at locations 31A and 31B is half of the wavelength $\lambda$; and since the physical distance between the location 31A and location 31C is half of the wavelength $\lambda$, the change in total wave path for interrogating the tag 16 at locations 31A and 31C is one wavelength $\lambda$.

Figure 3:
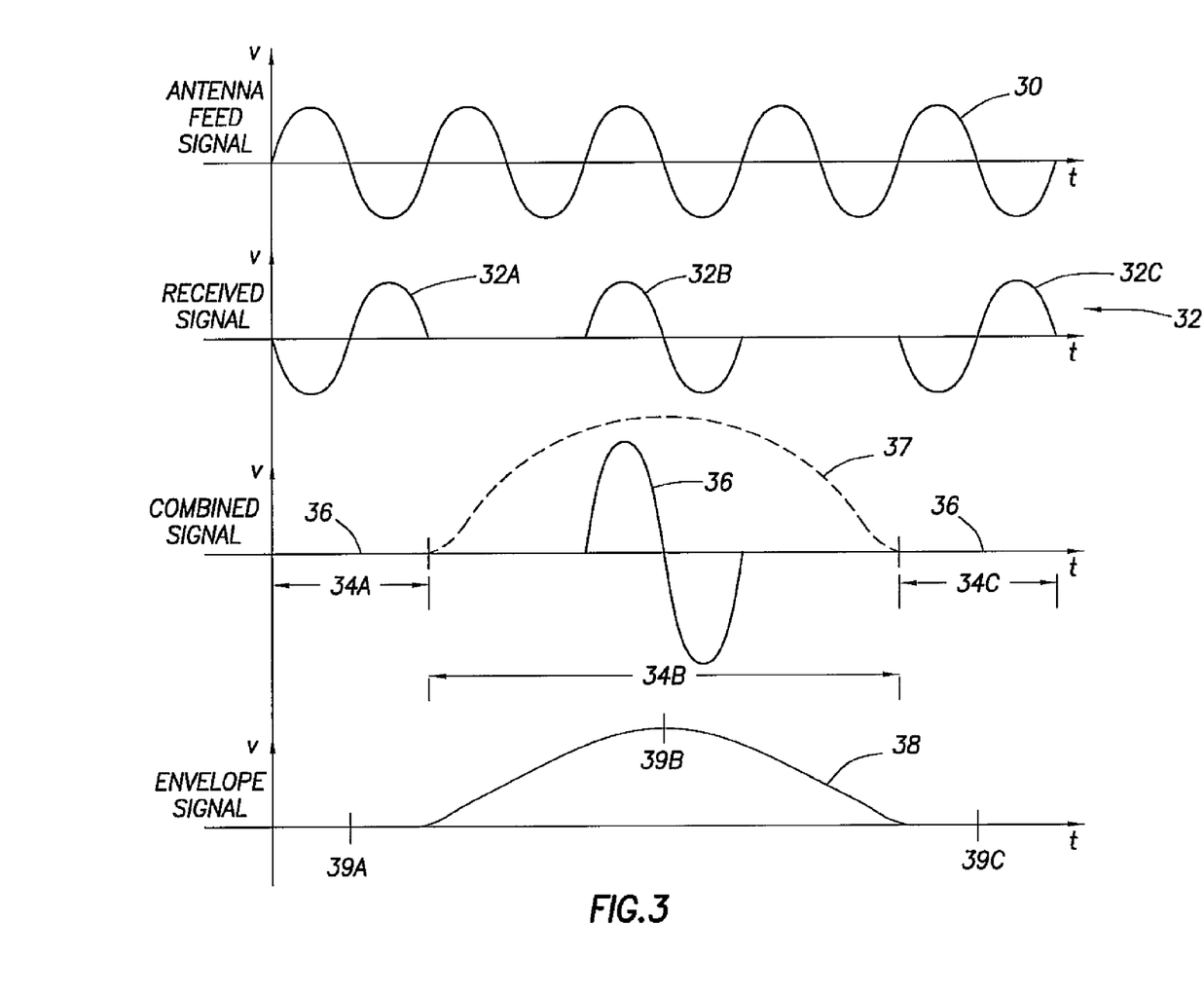
FIG. 3 shows calculation of sum signal and envelope signal.

FIG. 3 illustrates various time varying signals associated with sending the interrogating electromagnetic wave and receiving backscattered electromagnetic waves to more fully explain the signals and how the signals are combined to determine various parameters. In particular, FIG. 3 illustrates an antenna feed signal 30 which is applied to the reading antenna 18 during interrogation. The RFID tag 16 (which is assumed for this example to be moving at a constant velocity) reflects a portion of the interrogating electromagnetic wave to create reflected or backscattered electromagnetic wave that is incident upon the reading antenna 18, and therefore creates a received signal 32, illustrated in FIG. 3 as received signal portions 32A-32C (optionally scaled by amplification). Referring simultaneously to FIGS. 2 and 3, each of the received signal portions 32A, 32B and 32C are based on the backscattered electromagnetic wave received from the RFID tag 16 as the tag moves through positions 31A, 31B and 31C, respectively. At least because of the difference in distance between the RFID tag 16 and the reading antenna 18 for each location 31A, 31B and 31C, each of the received signal portions 32A-32C has an associated phase and amplitude that may be different from the other portions, and may also be different from antenna feed signal 30. FIG. 3 illustrates only three portions of received signal 32 corresponding to three particular positions of the RFID tag 16 so as to not to unduly complicate the drawings; however, in actuality one continuous backscattered electromagnetic wave is received by the reading antenna 18 producing one continuous received signal 32, and the received signal 32 has varying amplitude and phase based on the distance from the RFID tag to the reading antenna and the velocity at which the RFID tag is moving relative to the reading antenna.

In order to determine physical parameters as between the RFID tag and the reading antenna, and in accordance with at least some embodiments, the reader circuit 19 and/or electronic system 21 combine the antenna feed signal 30 and the received signal 32 over a period of time to generate a combined signal 36. Combining the antenna feed signal 30 and the received signal 32 may take many forms. In some embodiments, the antenna feed signal 32 and received signal are summed in analog form to create combined signal 36. In yet still other embodiments, the antenna feed signal 30 and received signal 32 are mixed (i.e., multiplied) in analog form to create the combined signal 36. In yet still other embodiments, the antenna feed signal 30 and received signal 32 may be combined (e.g., summed, mixed) in digital form. Other digital techniques may comprise exclusive-ORing (XOR) portions or all of the digital representation of the antenna feed signal 30 and received signal 32.

Regardless of whether performed using analog or digital versions of the signals, and regardless of the precise form of the combining, in some of the embodiments before the received signal 32 and the antenna feed signal 30 are combined the reader circuit 19 and/or electronic system 21 normalize the amplitude of the signals. Normalization is performed to avoid combining signals that have peak amplitude substantially different form each other. In FIG. 3 the combined signal 36 is logically divided into smaller portions 34A-34C for purposes of discussion. Considering first portion 34A of the combined signal 36, portion 34A is the combination (in the illustrative case of FIG. 3, a sum) of portion 32A of the received signal with corresponding portions of the antenna feed signal 30. Since in this illustrative example the two signals are 180 degrees out of phase with each other, the signals cancel producing zero-value or null portion of the sum signal 36 (a similar result occurs when the signals are combined by mixing). Similarly, third portion 34C of the combined signal 36 is the combination of portion 32C of the received signal with corresponding portions of the antenna feed signal 30. Here again, since in this illustrative example the two signals are 180 degrees out of phase with each, the signals cancel producing a zero-value portion 34C of the combined signal 36. Finally, portion 34B of the combined signal 36 is the combination of portion 32B of the received signal with corresponding portions of the antenna feed signal 30. Since in this illustrative example the signals are in phase with each other, the portion 34B of the sum signal 36 has amplitude that is approximately two times that of the signals considered alone.

The final combined signal 36 has varying amplitude due the phase difference in the antenna feed signal 30 and the received signal 32, and defines an envelope 37. The reader circuit 19 and/or electronic system 21 determine the envelope from the combined signal 36 (e.g., using a demodulator) to produce envelope signal 38. Illustrative envelope signal 38 comprises a plurality of inflection points 39A-39C based on changing physical distance between the RFID tag 16 and the reading antenna 18 (e.g., as shown in FIG. 2). In particular, in the illustrations of FIGS. 2 and 3 the inflection points 39A-39C correlate with the positions 31A-31C of the object 10 on the conveyer system 12. The correlation exists because at some physical distances the phase of the received signal (corresponding to the backscattered electromagnetic wave) and the antenna feed signal (corresponding to the interrogating electromagnetic wave) cancel when combined, and at other physical distances the phases are aligned. In accordance with various embodiments, the reader circuit 19 and/or electronic system 21 find at least some inflection points (e.g., maxima, minima, nulls, or zero-points) in the envelope signal 38. Using at least some of the infection points, the reader circuit 19 and/or electronic system 21 determine physical parameters as between RFID tag and the reading antenna.

Consider, for purposes of explanation, that the reader circuit 19 and/or the electronic system 21 find and use inflection points being nulls in the envelope signal 38 as the mechanism to determine physical parameters as between the RFID tag 16 and reading antenna 18. As discussed above, the illustrative positions 31A and 31C of the RFID tag 16 correspond to nulls 39A and 39C of the envelope signal 38, respectively. Further, the distance between the nulls, distance 35 in FIG. 2, was defined to be half of a wavelength of the interrogating electromagnetic wave. When the time period between the nulls 39A and 39C is t, the speed of the RFID tag 16 can be determined as $\lambda/(2*t)$.

In some of the embodiments then, the velocity of the RFID tag 16 is calculated according to the following equation:

$$V_{tag} = \frac{\Delta NullCounts * \lambda}{2\Delta Seconds} \quad (1)$$

where $V_{tag}$ is the velocity of the RFID tag, $\Delta$Seconds is a period of time in seconds between the first and last nulls, $\Delta$NullCounts is the change in null count between the first and last nulls occurring over $\Delta$Seconds, and $\lambda$ is the wavelength of the interrogating electromagnetic wave. The remaining portions of this description are based on determining inflection points being nulls in the envelope signal 38; however, using nulls as the inflection points is merely illustrative. Any corresponding inflection points within the envelope signal 38 (e.g., maxima points, minima points) may be used to determine $V_{tag}$, and thus $\Delta$NullCounts in equation (1) may be generalized to be $\Delta$CorrespondingInflectionPoints. To provide best accuracy, if the envelope is sampled such that the sampled data begins before a first $\Delta$CorrespondingInflectionPoints and/or extends beyond a later occurring final $\Delta$CorrespondingInflectionPoints, the $\Delta$Seconds data may be determined using only the time between the first and final $\Delta$CorrespondingInflectionPoints, ignoring the time before the first $\Delta$CorrespondingInflectionPoints and the time after the final $\Delta$CorrespondingInflectionPoints.

As a numerical example, consider that the interrogating electromagnetic wave has a frequency of 900 Mega-Hertz (MHz), which corresponds to a wavelength $\lambda$, of approximately 0.3 meters or approximately 12 inches. If two nulls beyond the starting null are found in the envelope signal 38 over a period of one second, then $V_{tag}$ for RFID tag would be approximately (2*0.3 meters)/(2*1 second)=0.3 meters/second or 12 inches/second.

Determining velocity of the RFID 16 based on counting the number of nulls over a period of time may be extended to determine position. For example, if a starting position is known or estimated (e.g., using a mechanical trigger, optical trigger and/or a predefined initial value), a new position can be determined using the nulls. In some of the embodiments, a new position of the RFID tag 16 is calculated according to the following equation:

$$NewPosition = StartPosition \pm V_{tag} * \Delta Time \quad (2)$$
$$= (\Delta NullCounts * \lambda * \Delta Time / (2 * \Delta Seconds))$$

where NewPosition is the calculated new position, StartPosition is the known or estimated starting position, $\Delta$Time is the time period between the starting position and the new position, $\Delta$NullCounts and $\lambda$ and $\Delta$Seconds are as discussed with respect to equation (1), and whether to add or subtract the parenthetical term is based on whether the RFID tag 16 and underlying object are moving toward or away from the reading antenna and where the tag velocity is constant within an acceptable tolerance. With respect to determining whether the RFID tag is moving toward or away from the reading antenna 18, the reader circuit 19 and/or electronic system 21 may observe the return signal strength indication (RSSI) of the received signal 32 (before normalization), and add or subtract the parenthetical term of equation (2) based on RSSI. For example, an increasing RSSI is indicative of the RFID tag moving toward the reading antenna (or vice versa), thus indicating subtraction of the parenthetical term. Conversely, a decreasing RSSI is indicative of the RFID tag moving away from the reading antenna (or vice versa), thus indicating addition of the parenthetical term.

Using the illustrative numerical example above of a 900 MHz interrogating electromagnetic wave, two null counts in one second detected beyond the starting null, an assumed starting position of 12 inches from the reading antenna and an assumed direction of the RFID tag moving away from the reading antenna, the new position of the RFID tag is calculated to be approximately 12 inches+(2*12 inches)/2=24 inches from the reading antenna (assuming the starting position coincides with the starting null). For best accuracy, if time data for the purpose of determining $V_{tag}$ uses only the time between first and final inflection points, thereby ignoring time before the first inflection point and after the final inflection point, then the ignored time may be added on to determine that total $\Delta$Time for determining the position. For example, the time period between the starting and new position can be measured as $\Delta$Time, during which the time period between the first and last nulls can be measured as $\Delta$Seconds (ignore the time before the first nulls and the time after the last nulls). Alternatively, the null occurred before the starting position can be selected as the first null; and the null occurred after the new position can be selected as the last null, in which case time period $\Delta$Time is contained within the time period $\Delta$Seconds.

The various embodiments, however, are not limited to determining just velocity and/or location, as other parameters that are based on velocity may also be determined. For example, acceleration is the first time derivative of $V_{tag}$, and jerk (equivalently referred to as jolt) is the second time derivative of $V_{tag}$.

Returning to FIG. 2, in accordance with other embodiments the system 200 has a second reader circuit 23 and reading antenna 20 placed, for example, on the opposite side as the first reader circuit 19 and reading antenna 18. In such embodiments, any physical parameter (e.g., velocity, position, acceleration and jerk) may be verified by signals from reading antenna 20. In other embodiments, the second reader circuit 23 and reading antenna 20 are placed such that they are at an angle with each other, (e.g. a right angle). In the yet still other embodiments, a third reader is placed orthogonal to the plane established by the reader 19 and reader 23.

Figure 4:
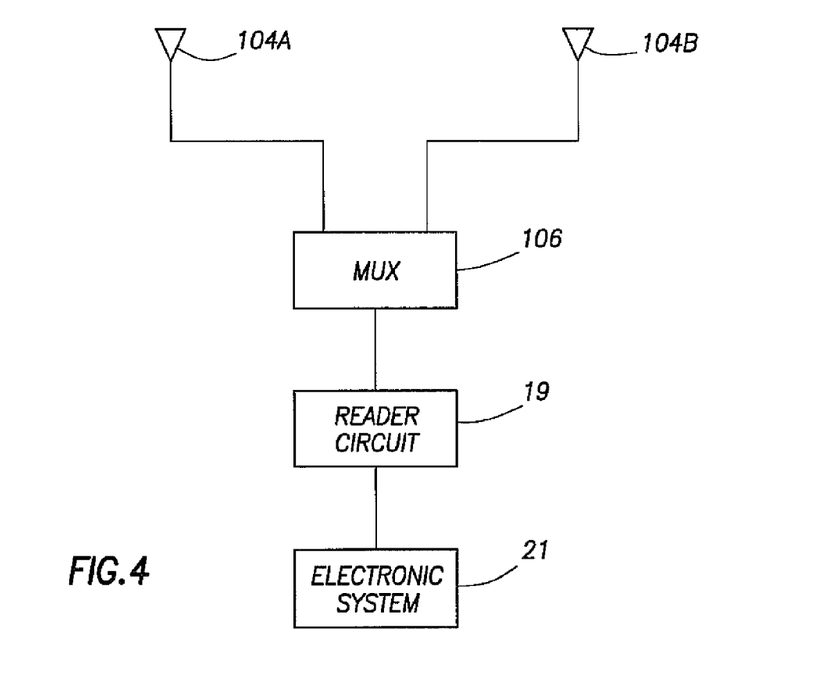
FIG. 4 shows a system in accordance with other embodiments.

FIG. 4 illustrates other embodiments where a single reader circuit 19 couples to multiple reading antennas. In particular, FIG. 4 shows two reading antennas 104A and 104B (which antennas could be, for example, antennas 18 and 20 respectively of FIG. 3). The reading antennas 104A and 104B in FIG. 4 couple to a single reader circuit 19 by way of multiplexer 106, and the reader circuit 19 also couples to an electronic system 21.

Figure 5A:
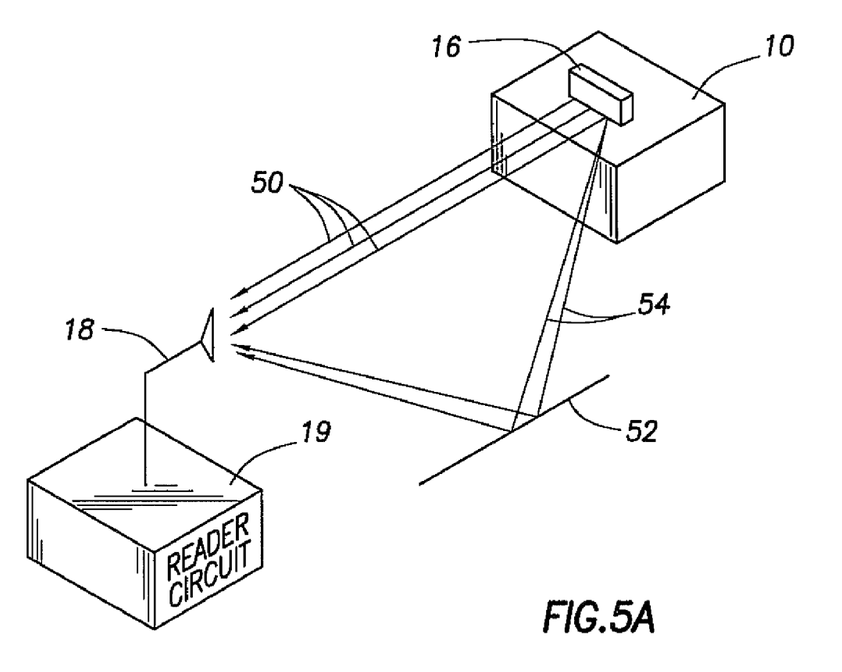
FIGS. 5A and 5B show multi-path signals and their envelope.

Many atmospheric conditions and/or man-made objects affect electromagnetic wave propagation, and thus lead to signal degradation. Multi-path degradation is a type of signal degradation where multiple backscattered electromagnetic waves arrive at the reading antenna by way of different paths. FIG. 5A illustrates such degradation. In particular, reading antenna 18 coupled to the reader circuit 19 receives backscattered electromagnetic waves from the RFID tag 16 associated with an object 10. The backscattered electromagnetic waves in FIG. 5A propagate using multiple paths to reach the reading antenna 18. In the illustration, some of the backscattered electromagnetic waves propagate along a line-of-sight path 50, and some of the backscattered electromagnetic waves are reflected due atmospheric conditions and/or man-made objects 52 and propagate along a different path 54 before reaching the reading antenna. Convergence of the multi-path backscattered waves at the reading antenna 18 has unfavorable consequences.

Figure 5B:
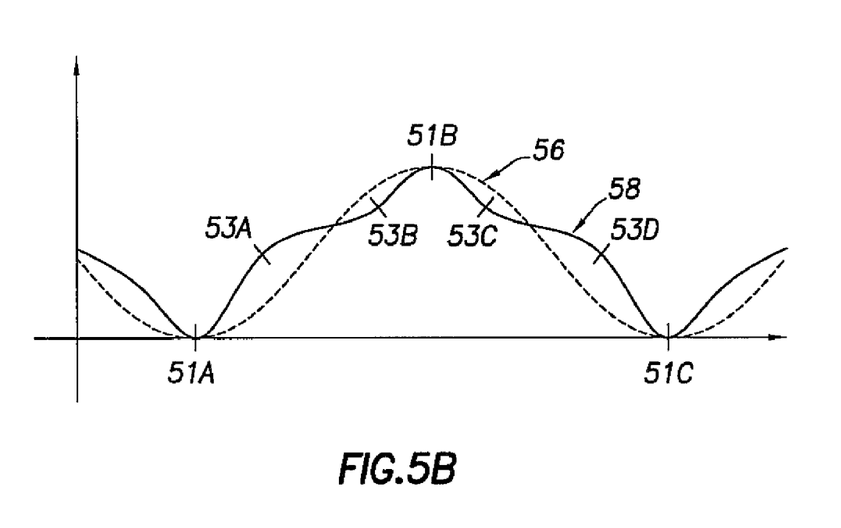

FIG. 5B illustrates two different envelope signals 56 and 58 calculated by the reader circuit 19 and/or electronic system 21. The envelope signal 56 is similar to envelope signal 38 (FIG. 2), and is a substantially smooth signal with three inflection points 51A-51C. The envelope signal 58 is not a substantially smooth signal, and has inflection points 51A-51C, along with extraneous inflection points 53A-53D. The signal 56 is associated with backscattered electromagnetic waves which do not propagate along multiple paths, whereas the signal 58 is associated with backscattered electromagnetic waves propagating along multiple paths 50 and 54 (as shown in FIG. 5A). In some embodiments, the multi-path degradation of the received backscattered electromagnetic waves is reduced by ignoring extraneous inflection points 53A-53D. In particular, the inflection points in envelope signals are classified into categories (e.g., inflection points associated with line-of-sight waveforms and inflection points associated with multi-path waveforms). The inflection points associated with multi-path waveforms are ignored and inflection points associated with line-of-sight waveforms are used in calculating the physical parameters.

In some of the embodiments, the RFID tag 16 responds to the interrogating electromagnetic wave with a tag identification value, or data held in the tag memory. In these embodiments, determining physical parameters as between the RFID tag and the reading antenna are based on periods of time when the RFID tag is reflective. However, in some situations the periods of time when the RFID tag is reflective as part of communicating data may be insufficient to determine the physical parameters (i.e., the data rate is too high and the reflective period is therefore too short). Thus, in other embodiments RFID tag 16 may be placed in a reflective mode such that, for extended periods of time relative to selectively backscattering to send data, the RFID tag is in a purely reflective mode. The reader circuit 19 and/or electronic system 21 in these embodiments are configure to send a command instructing the RFID tag 16 to change its operation to a constant or alternating repetitive state; hence, the electromagnetic waves received at the reading antenna 18 are only backscattered electromagnetic wave without any associated data. The RFID tag 16 is configured to time out of the reflective state, or the command sent to place the tag in the reflective state, may comprise a period of time for the RFID tag to stay reflective, and then revert to prior operational modes. Thus, by setting the RFID tag 16 to a reflective state determining of physical parameters as between the RFID tag 16 and reading antenna 18 can occur for a longer periods of time, or occur more rapidly.

Figure 6:
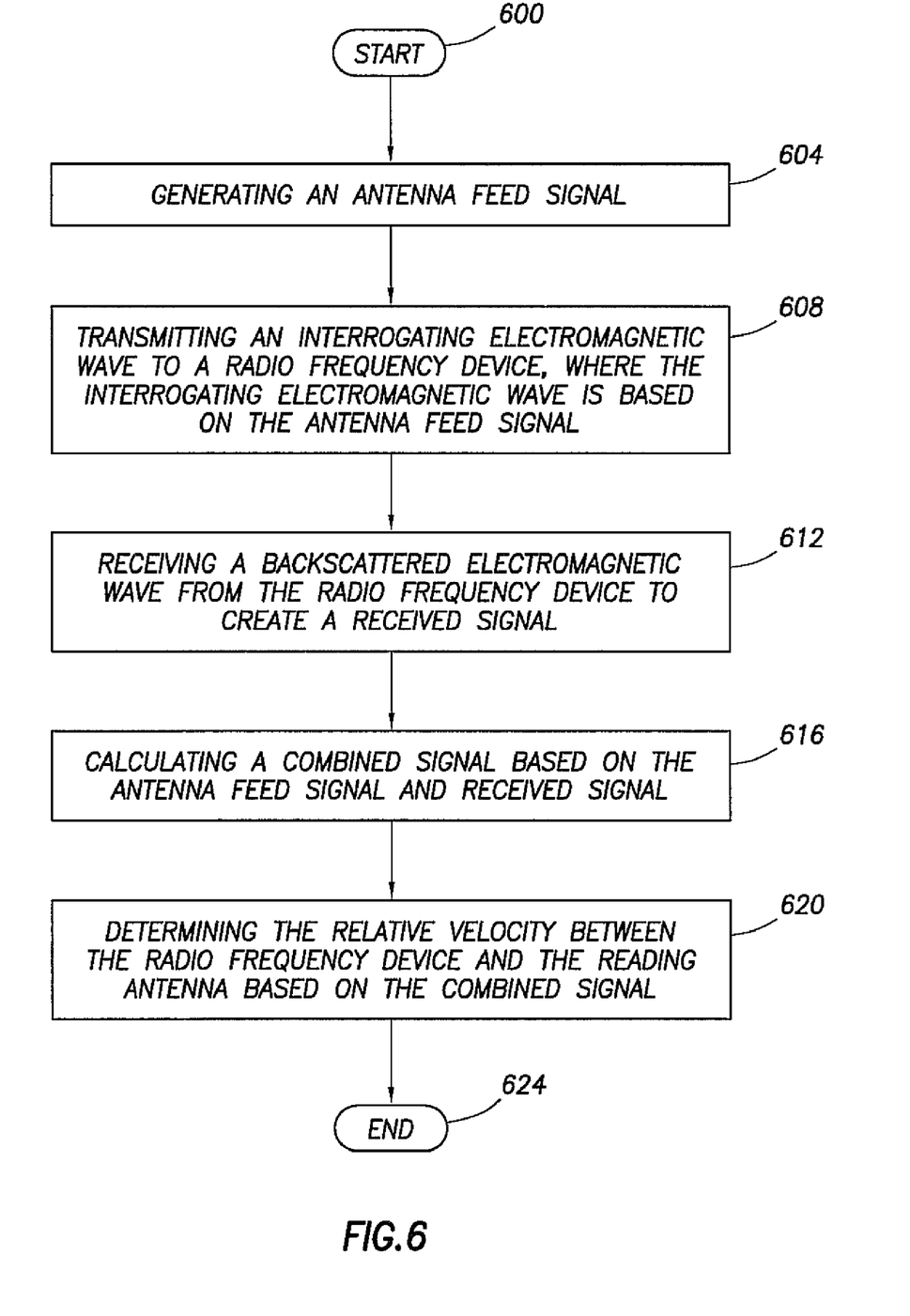
FIG. 6 shows a method in accordance with at least some embodiments.

FIG. 6 shows a method in accordance with at least some embodiments. In particular, the method starts (block 600) and moves to generating an antenna feed signal (block 604). Next, an interrogating electromagnetic wave is sent to a radio frequency device (block 608), where the interrogating electromagnetic wave is based on the antenna feed signal. In some embodiments, the radio frequency device is an RFID tag. Thereafter, a backscattered electromagnetic wave is received from the radio frequency device to create a received signal (block 612). Next, a combined signal is calculated based on the antenna feed signal and received signal (block 616). Finally, a determination is made as to the relative velocity between the radio frequency device and the reading antenna based on the combined signal (block 620), and the method ends (block 624).

The above discussion is meant to be illustrative of the principles and various embodiments of the present invention. Numerous variations and modifications will become apparent to those skilled in the art once the above disclosure is fully appreciated. For example, the combining of the antenna feed signal and received signal may be performed with those signal in analog form, or the combining may be performed with digital representations of the signals. Moreover, the various embodiments are discussed with respect to the RFID tag moving and the reader circuit stationary; however, in other embodiments the physical parameters are determined with respect to a stationary RFID tag and reader circuit moving (e.g. in a warehouse in order to inventory objects on shelves). Finally, while in the various embodiments discussed the interrogating electromagnetic wave is transmitted from the same antenna as receives the backscattered electromagnetic wave, in alternative embodiments separate antennas may be used with one to transmit the interrogating electromagnetic wave, and the second to receive the backscattered electromagnetic wave. It is intended that the following claims be interpreted to embrace all such variations and modifications.

What is claimed is:

1. A method implemented in a radio frequency identification (RFID) system, the method comprising:
   an RFID reader generating an antenna feed signal and transmitting a first electromagnetic wave to an RFID tag according to the antenna feed signal;

the RFID reader receiving a backscattered electromagnetic wave from the RFID tag to create a received signal;

generating a combined signal based on the antenna feed signal and the received signal, wherein the combined signal includes a plurality of inflection points, each inflection point corresponding to a different position of the RFID tag relative to the RFID reader, wherein the plurality of inflection points comprises a first inflection point, a last inflection point, and at least one intermediate inflection point between the first inflection point and the last inflection point; and determining a relative velocity between the RFID tag and the RFID reader by detecting the inflection points of the combined signal over a predetermined time period, wherein the predetermined time period begins at a time associated with the first inflection point and ends at a time associated with the last inflection point.

2. The method of claim 1, wherein the backscattered electromagnetic wave is received during the RFID reader interrogating the RFID tag using the antenna feed signal.

3. The method of claim 1, wherein the generating of the combined signal comprises summing the antenna feed signal and the received signal, mixing the antenna feed signal with the received signal, or performing an exclusive-OR using at least portions of the antenna feed signal and the received signal.

4. The method of claim 1, wherein the inflection points include one or more of null, minima, and maxima.

5. The method of claim 1, wherein the backscattered electromagnetic wave is generated by the RFID tag in response to a command from the RFID reader.

6. The method of claim 5, wherein the RFID tag is instructed by the command to be in a reflective state to generate the backscattered electromagnetic wave without associated data.

7. A system comprising:
a radio frequency identification (RFID) tag;
a reading antenna; and
a reader circuit coupled to the reading antenna to transmit a first electromagnetic wave to the RFID tag, based on an antenna feed signal, and to receive a received signal based on a backscattered electromagnetic wave from the RFID tag; wherein the reader circuit generates a combined signal of the antenna feed signal and the received signal;
wherein the combined signal includes a plurality of inflection points, each inflection point corresponding to a different position of the RFID tag relative to the reading antenna;
wherein the plurality of inflection points comprises a first inflection point, a last inflection point, and at least one intermediate inflection point between the first inflection point and the last inflection point;
wherein the reader circuit determines a relative velocity between the RFID tag and the reading antenna by detecting the inflection points of the combined signal over a predetermined time period, wherein the predetermined time period begins at a time associated with the first inflection point and ends at a time associated with the last inflection point.

8. The system of claim 7, wherein the reader circuit determines the relative velocity by counting the inflection points in the combined signal.

9. The system of claim 8, wherein the inflection points include at least null points, maximum points, or minimum points in an envelope signal of the combined signal.

10. The system of claim 7, wherein the combined signal is a sum of the antenna feed signal and the received signal, a multiplication of the antenna feed signal with the received signal, or a result of an exclusive-OR applied on at least portions of the antenna feed signal and the received signal.

11. The system of claim 7, wherein the reader circuit determines identification data stored on the RFID tag and instructs the RFID tag to be in a reflective state to generate the backscattered electromagnetic wave without data.

12. The system of claim 7, wherein the RFID tag comprises a passive tag or a semi-active tag.

13. A radio frequency identification (RFID) reader, comprising:
a reading antenna; and
a reader circuit coupled to the reading antenna to receive a backscattered electromagnetic wave from an RFID tag to create a received signal, wherein the reader circuit generates an antenna feed signal corresponding to the backscattered electromagnetic wave,
the reader circuit determining a relative velocity between the RFID tag and the reader circuit based on a combined signal of the antenna feed signal and the received signal,
wherein the combined signal includes a plurality of inflection points, each inflection point corresponding to a different position of the RFID tag relative to the reading antenna,
wherein the plurality of inflection points comprises a first inflection point, a last inflection point, and at least one intermediate inflection point between the first inflection point and the last inflection point,
wherein the reader circuit determines the relative velocity by detecting the inflection points of the combined signal over a predetermined time period, wherein the predetermined time period begins at a time associated with the first inflection point and ends at a time associated with the last inflection point.

14. The radio frequency identification reader of claim 13, wherein the inflection points include at least null points, minimum points or maximum points.

15. The radio frequency identification reader of claim 13, wherein the combined signal comprises an envelope signal of a sum of the antenna feed signal and the received signal, a multiplication of the antenna feed signal with the received signal, or a result of an exclusive-OR applied on at least portions of the antenna feed signal and the received signal.

16. A non-transitory computer-readable medium storing a program that, when executed by a radio frequency identification (RFID) system, causes the system to:
generate an antenna feed signal and transmit a first electromagnetic wave from an RFID reader to an RFID tag according to the antenna feed signal;
receive a backscattered electromagnetic wave from the RFID tag to create a received signal;
generate a combined signal based on the antenna feed signal and the received signal, wherein the combined signal includes a plurality of inflection points, each inflection point corresponding to a different position of the RFID tag relative to the RFID reader, wherein the plurality of inflection points comprises a first inflection point, a last inflection point, and at least one intermediate inflection point between the first inflection point and the last inflection point; and
determine a relative velocity between the RFID tag and the RFID reader by detecting the inflection points of the combined signal over a predetermined time period, wherein the predetermined time period begins at a time associated with the first inflection point and ends at a time associated with the last inflection point.

17. The method of claim 1, wherein the first inflection point and the last inflection point each correspond to a null value.

* * * * *